US006985891B2

(12) United States Patent
Redmond et al.

(10) Patent No.: US 6,985,891 B2
(45) Date of Patent: Jan. 10, 2006

(54) TRACKING OF COMPUTER BASED TRAINING COURSES

(75) Inventors: Anthony Redmond, Dublin (IE); Martin Mangan, Dublin (IE)

(73) Assignee: CBT (Technology) Limited, Dublin (IE)

( * ) Notice: Subject to any disclaimer, the term of this patent is extended or adjusted under 35 U.S.C. 154(b) by 773 days.

(21) Appl. No.: 09/995,739

(22) Filed: Nov. 29, 2001

(65) Prior Publication Data

US 2002/0095401 A1 Jul. 18, 2002

(30) Foreign Application Priority Data

Nov. 30, 2000 (IE) .......................................... 2000/0973

(51) Int. Cl.
*G06F 7/00* (2006.01)

(52) U.S. Cl. .......................................................... 707/1

(58) Field of Classification Search ..................... 707/1, 707/100, 102, 104.1
See application file for complete search history.

(56) References Cited

U.S. PATENT DOCUMENTS 5,859,972 A 1/1999 Subramaniam et al. ..... 395/200
6,442,748 B1 * 8/2002 Bowman-Amuah ......... 717/108
6,496,850 B1 * 12/2002 Bowman-Amuah ......... 709/203
6,529,909 B1 * 3/2003 Bowman-Amuah .......... 707/10
6,539,396 B1 * 3/2003 Bowman-Amuah ..... 707/103 R
6,778,979 B2 * 8/2004 Grefenstette et al. .......... 707/3
2002/0188679 A1 * 12/2002 Matous et al. .............. 709/204
2003/0204522 A1 * 10/2003 Gallagher et al. .......... 707/102
2004/0122849 A1 * 6/2004 Nelson ....................... 707/102
2004/0143597 A1 * 7/2004 Benson et al. ........... 707/104.1
2004/0267811 A1 * 12/2004 Nelson et al. ........... 707/104.1
2005/0015357 A1 * 1/2005 Shahidi ......................... 707/1

FOREIGN PATENT DOCUMENTS

EP 0690426 B1 1/1996
EP 0809198 A2 11/1997

OTHER PUBLICATIONS

Multi–attribute tradeoff analysis applied to long–term generation planning Huber, H.E.; Redmond, J.A.; McDonald, J.R.; Advances in Power System Control, Operation and Management, APSCOM–93., 2nd Intnal Conference on , 1993 pp.: 906–906.*

* cited by examiner

*Primary Examiner*—Anthony Knight
*Assistant Examiner*—Michael B. Holmes
(74) *Attorney, Agent, or Firm*—Jacobson Holman PLLC

(57) ABSTRACT

A tracking system (1) updates data to, and retrieves data from, learning management databases (10). Update data is received from course player servers (4), and requests are received from client systems. A common interface (21) interfaces with all players and clients, and it polls translation modules (22) for an appropriate and available module when a message is received. A tracking engine (20) manages threads and a queue for both synchronous and asynchronous communication. The queue is linked with database interfaces (24), which are Schema Access Objects (SAOs). Each SAO is pooled as a set of instances, activated and managed by a pooling manager.

26 Claims, 2 Drawing Sheets

Student Browsers
2
3
4
Course Player Server
Internet
From Other Players & Clients
Tracking System
From Other Players & Clients
1
10
Learning Management DBs

TRACKING OF COMPUTER BASED TRAINING COURSES

INTRODUCTION

1. Field of the Invention

The invention relates to learning management, and more particularly to tracking of progress of computer based training courses.

2. Prior Art Discussion

Our European Patent No. 0690426B describes a computer based training system ("course player") which delivers and manages course content for a student. As computer based training has developed, many students use a number of courses. Also, a particular organisation may have many students and many courses, possibly hosted on an intranet. This gives rise to a need for tracking of courses according to various criteria including per student, per organisation group, and per course.

Thus, the invention is directed towards providing a system for effective and versatile tracking of computer based training courses.

SUMMARY OF THE INVENTION

According to the invention, there is provided a tracking system comprising means for receiving course player update data, and for writing the update data to a learning management database, characterised in that, the system comprises database interface means for communication with a plurality of learning management databases, and the system comprises a tracking engine comprising means for managing uni-directional communication for asynchronous course player data updates, and for managing bi-directional communication for synchronous course player data updates and responses.

In one embodiment, the system further comprises a plurality of translation modules, each comprising means for translating from a player language to a common engine language, and vice-versa.

In another embodiment, each translation module is an object instantiated at start-up.

In a further embodiment, the system further comprises a common interface comprising means for interfacing with all players, and for polling by routing a received message to all translation modules; wherein each translation module comprises means for parsing received messages and, if it can translate the message, indicating as such; and wherein the common interface comprises means for activating a translation module which responds positively.

In one embodiment, the common interface comprises means for polling the translation modules according to a pre-set file.

In another embodiment, the common interface comprises means for receiving translated messages from the translation modules.

In a further embodiment, the engine comprises means for managing a queue, and for establishing threads for input and output to the queue.

In one embodiment, the engine comprises means for assuming that a data update message is synchronous unless the message indicates otherwise.

In another embodiment, the database interface means comprises a schema access object (SAO) associated with each learning management database.

In a further embodiment, all SAOs have the same exposed interface to the tracking engine.

In one embodiment, the system comprises means for both pre-setting and for subsequently modifying associations between players and SAOs.

In another embodiment, the system comprises pooling means, comprising means for creating a number of instances of each SAO and for reusing the instances.

In a further embodiment, the pooling means comprises a manager comprising means for managing a pool of SAOs, for determining a free SAO if one exists, for putting a requesting thread in a sleep state if an instance is temporarily unavailable, and for instructing a new set of SAO instances to be created.

In one embodiment, the system comprises means for determining during initialisation a connection string to be passed to an SAO instance to indicate the database to be opened.

In another embodiment, the manager comprises means for re-initialising a pooled SAO instance if it operates incorrectly.

In a further embodiment, the tracking engine comprises means for maintaining an input thread between the common interface and the queue.

In one embodiment, the tracking engine comprises means for maintaining a plurality of database-side threads for routing messages from the queue to the database interface means.

In another embodiment, each database-side thread comprises means for waiting for a response from the database interface means, and for directly routing received responses to a relevant translation module for translation and for receiving translated responses back from the translation modules.

In a further embodiment, each database-side thread comprises means for directly routing a translated response to an originating player.

In one embodiment, the engine comprises means for maintaining each database-side thread in an active state or a sleep state.

In another embodiment, the engine comprises means for switching a database-side thread to an active state in response to the input thread request.

In one embodiment, the engine comprises means for writing the contents of the queue to a log file when shutting down unexpectedly, and for automatically searching for a log file upon start-up.

In another embodiment, the common interface comprises a time-out function comprising means for terminating a player connection upon expiry of a pre-set time period.

In one embodiment, the database interface means comprises a time-out function comprising means for terminating a learning management database connection upon expiry of a pre-set time period.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
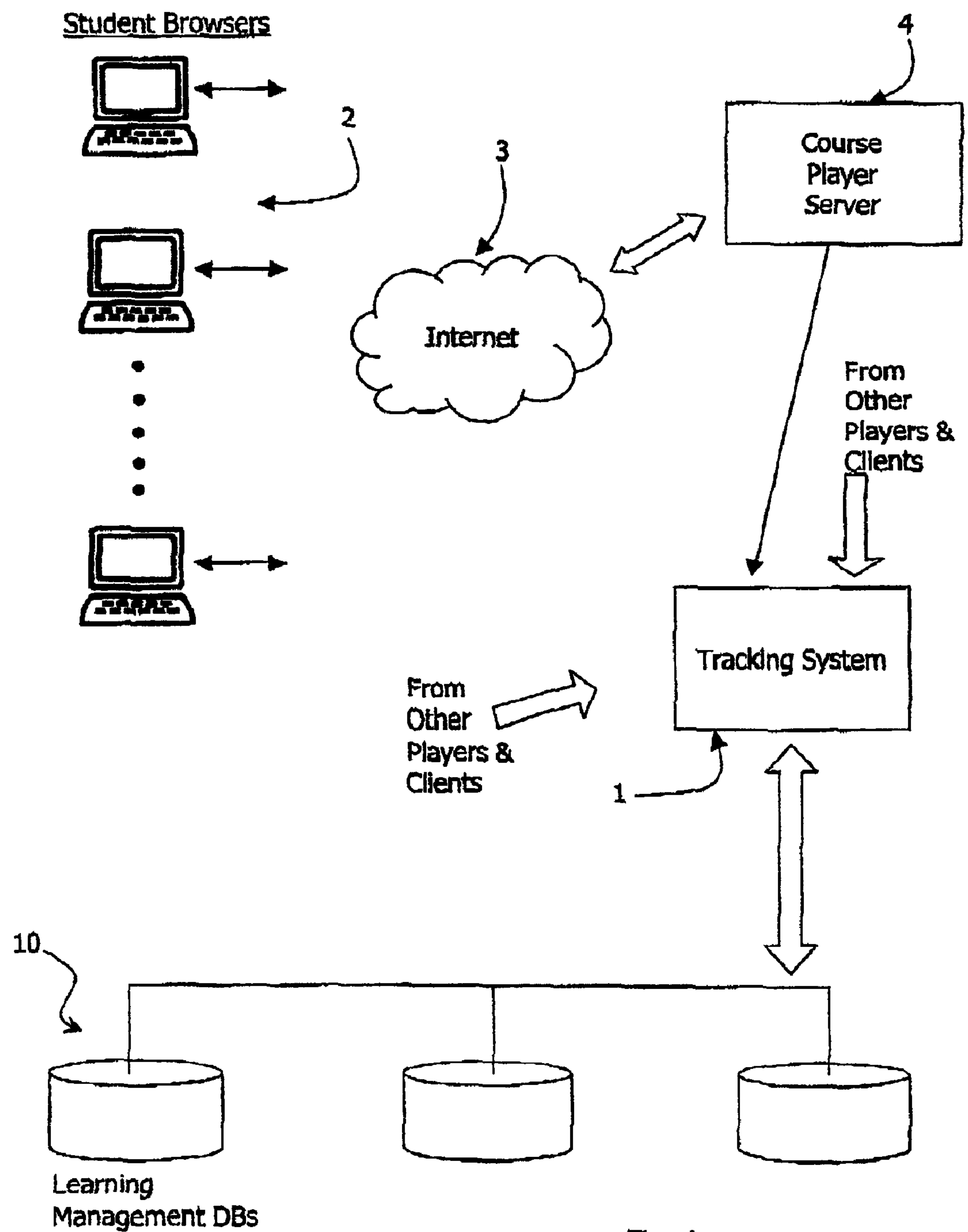
FIG. 1 is a high level diagram illustrating the context of a tracking system of the invention.

Referring to FIG. 1 a tracking system 1 is used for tracking progress of courses executing on student browsers 2 receiving content via the Internet 3 from course player servers 4. On its other side the tracking system 1 writes progress data to learning management databases 10.

In this embodiment all course data is received from course player servers 4, however, it may alternatively be received from stand-alone course players executing as applications on student computers. The players and/or player servers which provide the course data and the learning management databases may be operated by third parties. Thus, the operator of the tracking system 1 may provide a service of generating learning management data for any chosen player or player server for a third party.

The tracking system 1 operates with minimal impact on the course players and/or servers (henceforth "players"). One reason is that they can communicate asynchronously in a "fire and forget" mode. This is made possible by use of a low-level communication layer (TCP) ensuring safe receipt.

The tracking system 1 can handle data captures from players at any frequency to suit the player, the range being from seconds to hours. Some players may be configured for updating on a timed basis of every two seconds, whereas others may be configured for updating only after the end of a course. In the latter case, the player performs internal tracking during the course.

Figure 2:
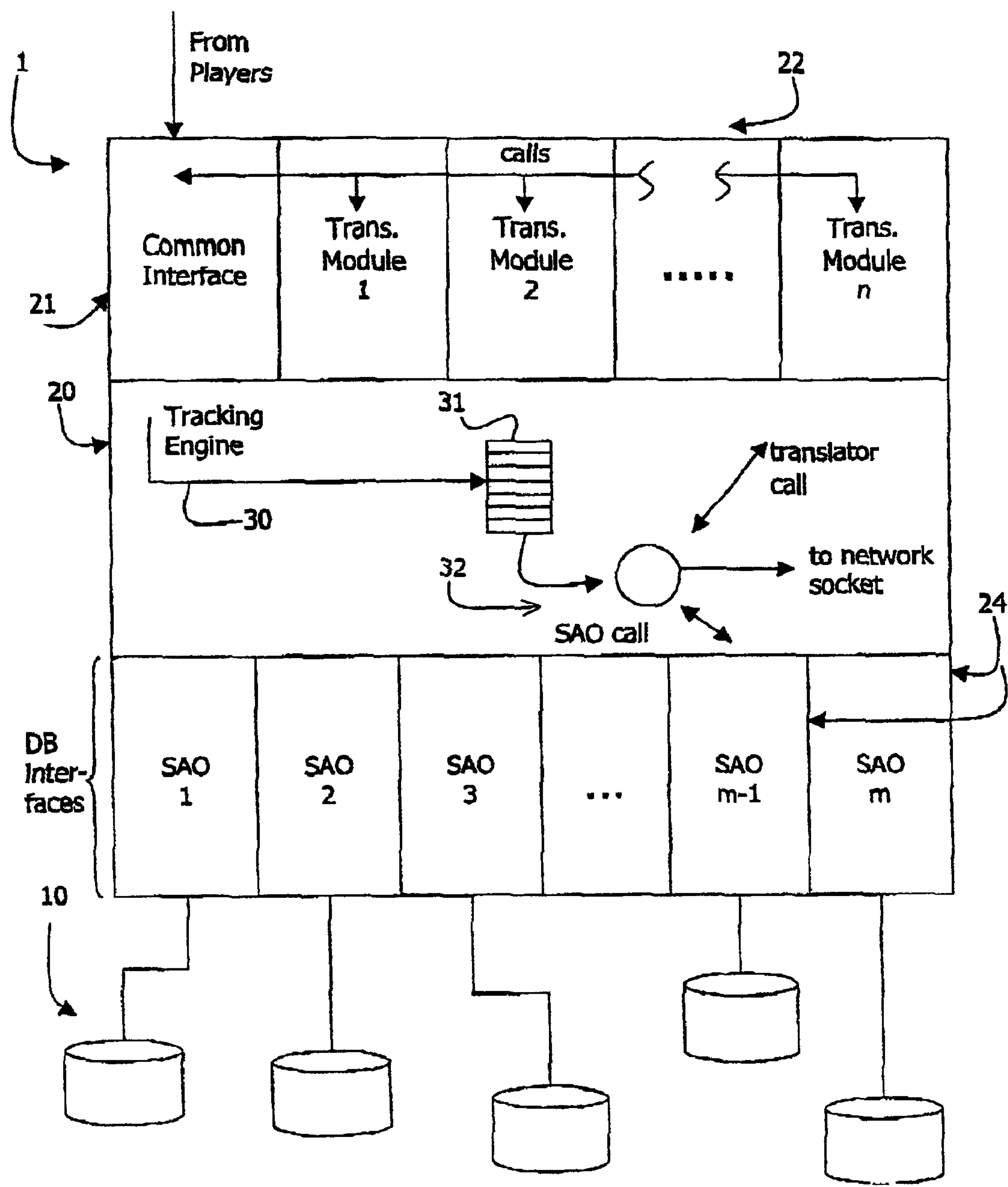
FIG. 2 is a diagram illustrating architecture of the tracking system.

Referring to FIG. 2, the tracking system 1 comprises a central tracking engine 20. A common interface 21 communicates with all players, and routes signals to a chosen translation module 22 ("translator"). The engine 20 manages threads between the translators 22 and database interfaces 24. There is one database interface 24 for each learning database 10. The engine 20 performs queuing so that there is effective buffering between the players 4 and the databases 10.

In more detail, the tracking system 1 also interfaces on the player side with client systems requesting data, such as a testing engine or a reporting tool. The translation modules 22 translate to a common language used by the tracking engine 2, CMIML2. If the incoming data is in this format it is routed directly to the engine 20 without translation.

The engine 20 queues received requests/data messages and parses them while in the queues. It then performs the database operation via the interfaces 24, either writes or reads. Where the incoming message is synchronous the engine routes a response back to the requesting application.

Each database interface 24 is a SAO (Schema Access Object). This is an object that understands how student tracking information is stored in a particular type of learning management database (for example the student tracking database in Smartforce Campus™). Each SAO has the same interface exposed. Each SAO is defined in a module, having a well-defined factory method to create an instance of the SAO. The interface and the factory method that must exist in the SAO's module is defined. An SAO may be supplied as a modular plug-in to the system 1, typically by the suppliers of the databases 10.

To create an instance of an SAO, the system 1 loads the required module (located by its name and vendor), and invokes the defined factory method to obtain an instance of an object that complies with the well-known SAO interface.

There is an override for this process. It is possible for the set-up administrator to set up the system 1 in a way that specifies, "All requests that come from the player X should be dealt with by the Y SAO". This is achieved by changing the "redirect.dat" file. This is a file, which the administrator can edit, that redirects all requests for SAO A to requests for SAO B. This "redirect.dat" file is read when the system 1 starts up, and allows client systems to communicate with tracking databases of the administrator's choice, even if the particular combination of client system and database 10 were never designed to work together. The following is a sample redirect.dat file.

```
; Redirect.dat
; SAO Redirection
;
; This file is a sample, to illustrate SAO redirection.
;
;
; The entries in this file are processed in the order in which
; they occur.
;
; The first entry (below) maps all requests for the
2.0|cbt|WebPlus SAO to the
1.0|VendorA|Learning_Management_System_A SAO.
;
2.0|cbt|WebPlus -> 1.0|VendorA|Learning_Management_System_A
;
;
; The next entry maps all other 2.0|cbt SAO requests to the
2.0|cbt|campus SAO.
; Note that the asterix '*' is a wildcard, and can correspond to
any name.
;
2.0|cbt|* -> 2.0|cbt|campus
;
;
; The last entry is a "catch-all". It maps all other requests to
the 2.0|cbt|null SAO.
;
;
*|*|* -> 2.0|cbt|null
```

The system 1 pools SAOs. This allows it to create a number of instances of each SAO, and reuse these instances for each request. When a request is received from a client, the request is examined. The request contains two fields indicating what product (and from which vendor) has sent the request. This correlates directly to an SAO. The system 1 queries an "SAO manager" to check if this SAO is already in memory. This leads to one of two situations:

1. If the required SAO is already in memory, the SAO manager examines its pool of SAOs to find a free instance of the required type of SAO. If none is available, the thread is put in a "sleep" state, waiting for an SAO to become available.
2. If the required SAO is not in memory, the SAO manager locates the correct module by name, loads it, and invokes the module's factory method. It invokes the factory method multiple times, each time retrieving a new instance of the SAO. These instances are placed in a pool for future use.

Each SAO module must have a corresponding INI file (which the administrator can edit), containing (at least) the number of instances of that SAO that should be pooled by the system 1, and the connection string that must be passed to the instance of the SAO in order for the SAO to know what database to open. This allows the administrator to point the SAO to a different instance of a database, without changing code. The system 1 examines this INI file before creating the pool of SAOs, and uses the "Pool size" value to decide how many instances of the SAO to create, and passes the connection string to the SAO when creating the SAO.

If, at any stage, the system 1 determines that an instance of an SAO ceases to operate correctly, it attempts to re-initialise that instance of the SAO. It does this by uninitialising the SAO, then attempting to re-initialise it again. This allows the system 1 to automatically recover, should the database crash or have any other fault.

The tracking engine 20 exists as a process executing on a server. Each translation module 22 is an object, stored in a module (a DLL on Windows, a JavaBean in Java). There is a setting (in a "sfconnect.ini" file) which the system 1 checks on start-up, indicating which translators 22 are to be used. The required translators 22 are loaded and used while the system 1 is executing. When a request is received from a client, the request is passed (using a method call) to each translator 22 in turn. The first translator that returns indicating that it can handle the request is chosen to handle that request. The order in which the translators are polled is according to a user-defined list, stored in an XML file and parsed on start-up.

Thus, the common interface 21 operates as a client of the translators 22, calling them as they are required. An input thread 30 of the tracking engine 20 delivers incoming messages from the common interface 21 to a queue 31. The thread 31 also activates database-side threads 32 as they are required.

The messages placed in the queue 31 include flags indicating the requesting player or client. Also, the common interface 21 inserts a flag indicating which, if any, translator 22 was used.

The queue 31 is a thread-safe data structure in memory, which grows and shrinks as needed. Administration settings specify the maximum permitted number of requests that can be queued at any one time.

The database-side threads 32 are permanent execution threads each operating on only one message at a time. They have active and sleep states, switching from the sleep to the active state in response to the input thread 30.

In the active state, a thread 32 reads the message currently at the head of the queue. It makes a call (invocation) on the relevant SAO 24 and awaits a response if the message is synchronous. It presumes a message is synchronous unless a flag in the message indicates otherwise.

Upon receipt of the response from the SAO 24, the thread 32 determines if translation is required. If so it makes a call on the relevant translator 22 (indicated in the message itself). Again, it awaits the translator's response. The response is then routed directly to the network socket for direct transmission to the originating player or client.

Integrity of the communication links is assisted by time-out programs which terminate connections between the player or client and the common interface 21 and between the SAOs and the databases 10 if pre-set times expire. This ensures that a faulty SAO does not affect overall system operation.

If the system 1 detects a severe problem, or receives an administrator message indicating that it should be unloaded from memory, it must shut down. Before shutting down, it examines its queue. Any requests in the queue are dumped out to a log file just before it shuts down. Every time it is started, it searches for this log file. If it exists, the contents of the log are re-queued for processing, and the log file deleted. This helps to ensure that requests are not lost, even if the system 1 must shut down.

The system 1 may operate in an asynchronous "fire-and-forget" mode. This allows a client to send a (typically update) request, and not wait for a response. The client can be confident that the request will be processed because:

1. The underlying network protocol, TCP, guarantees that any data is successfully sent only when the destination has received the data.
2. When the system 1 does receive the data, its queuing mechanism guarantees that it will be handled, even if a catastrophe occurs in the meantime.

The system 1 can use a network in two ways.

1. Dedicated Port

In this mode, it uses a dedicated port, and communicates directly using the language of choice (e.g. CMIML) over the network/internet on that port.

2. HTTP support

In this mode, requests as in (1) above are allowed. However, the system 1 also allows clients to "piggy-back" requests over HTTP, using the same port. For example, the administrator could configure the system 1 to operate on port 80, and turn on HTTP support. This allows client applications to either send the requests directly to the system 1 over port 80, or alternatively, to encapsulate the requests (and responses) in HTTP requests over port 80. This allows communication with the system 1 to occur over the Internet even where firewalls are in place. (Firewalls typically allow HTTP communications to pass, but block many other types of communication).

The settings that indicate to the system 1 which port to use, and whether or not to allow requests to be piggy-backed on HTTP, are located in the SFCONNECT.INI file. The administrator can change these settings himself.

It will be appreciated that the invention allows for extremely versatile updating and reporting from learning management databases. The translators, the threads, and the SAOs are particularly advantageous for versatility and also robustness.

The invention is not limited to the embodiments described but may be varied in construction and detail.

What is claimed is:

1. A tracking system (1) comprising means for receiving course player update data, and for writing the update data to a learning management database, characterised in that, the system (1) comprises database interface means for communication (24) with a plurality of learning management databases (10), and the system comprises a tracking engine (20) comprising means for managing uni-directional communication for asynchronous course player data updates, and for managing bi-directional communication for synchronous course player data updates and responses.

2. A system as claimed in claim 1, wherein the system further comprises a plurality of translation modules (22), each comprising means for translating from a player language to a common engine language, and vice-versa.

3. A system as claimed in claim 2, wherein each translation module is an object instantiated at start-up.

4. A system as claimed in claim 2, wherein the system (1) further comprises a common interface (21) comprising means for interfacing with all players (4), and for polling by routing a received message to all translation modules (22); wherein each translation module (22) comprises means for parsing received messages and, if it can translate the message, indicating as such; and wherein the common interface (21) comprises means for activating a translation module (22) which responds positively.

5. A system as claimed in claim 4, wherein the common interface (21) comprises means for polling the translation modules (22) according to a pre-set file.

6. A system as claimed in claim 5, wherein the common interface comprises means for receiving translated messages from the translation modules.

7. A system as claimed in claim 1, wherein the engine (20) comprises means for managing a queue (31), and for establishing threads for input and output to the queue.

8. A system as claimed in claim 7, wherein the engine (20) comprises means for assuming that a data update message is synchronous unless the message indicates otherwise.

9. A system as claimed in claim 1, wherein the database interface means (24) comprises a schema access object (SAO) associated with each learning management database (10).

10. A system as claimed in claim 9, wherein all SAOs (24) have the same exposed interface to the tracking engine (20).

11. A system as claimed in claim 9, wherein the system (1) comprises means for both pre-setting and for subsequently modifying associations between players and SAOs.

12. A system as claimed in any of claim 9, wherein the system (1) comprises pooling means, comprising means for creating a number of instances of each SAO and for reusing the instances.

13. A system as claimed in claim 12, wherein the pooling means comprises a manager comprising means for managing a pool of SAOs, for determining a free SAO if one exists, for putting a requesting thread in a sleep state if an instance is temporarily unavailable, and for instructing a new set of SAO instances to be created.

14. A system as claimed in claim 13, wherein the system (1) comprises means for determining during initialisation a connection string to be passed to an SAO instance to indicate the database (10) to be opened.

15. A system as claimed in claim 13, wherein the manager comprises means for re-initialising a pooled SAO instance if it operates incorrectly.

16. A system as claimed in claim 6, wherein the tracking engine (20) comprises means for maintaining an input thread (30) between the common interface (21) and the queue (31).

17. A system as claimed in any of claim 7, wherein the tracking engine (20) comprises means for maintaining a plurality of database-side threads (32) for routing messages from the queue (31) to the database interface means (24).

18. A system as claimed in claim 17, wherein each database-side thread (32) comprises means for waiting for a response from the database interface means (24), and for directly routing received responses to a relevant translation module (22) for translation and for receiving translated responses back from the translation modules.

19. A system as claimed in claim 18, wherein each database-side thread (32) comprises means for directly routing a translated response to an originating player.

20. A system as claimed in claim 17, wherein the engine (20) comprises means for maintaining each database-side thread (32) in an active state or a sleep state.

21. A system as claimed in claim 19, wherein the engine (20) comprises means for switching a database-side thread (32) to an active state in response to the input thread request.

22. A system as claimed in claim 1, wherein the engine (20) comprises means for writing the contents of the queue to a log file when shutting down unexpectedly, and for automatically searching for a log file upon start-up.

23. A system as claimed in claim 4, wherein the common interface (21) comprises a time-out function comprising means for terminating a player connection upon expiry of a pre-set time period.

24. A system as claimed in claim 1, wherein the database interface means comprises a time-out function comprising means for terminating a learning management database (10) connection upon expiry of a pre-set time period.

25. A tracking system (1) comprising means for receiving course player update data, and for writing the update data to a learning management database, characterised in that, the system (1) comprises database interface means for communication (24) with a plurality of learning management databases (10), the system comprises a tracking engine (20) comprising means for managing unidirectional communication for asynchronous course player data updates, and for managing bi-directional communication for synchronous course player data updates and responses;

wherein the system further comprises a plurality of translation modules (22), each comprising means for translating from a player language to a common engine language, and vice-versa;

wherein each translation module is an object instantiated at start-up; and wherein the system (1) further comprises a common interface (21) comprising means for interfacing with all players (4), and for polling by routing a received message to all translation modules (22); wherein each translation module (22) comprises means for parsing received messages and, if it can translate the message, indicating as such; and wherein the common interface (21) comprises means for activating a translation module (22) which responds positively.

26. A computer program product comprising software code for completing a system as claimed in claim 1 when executing on a digital computer.

* * * * *